June 13, 1933.　　　K. G. HASELTINE　　　1,913,804
FRUIT SIZING MACHINE
Filed Jan. 8, 1931　　　3 Sheets-Sheet 1

Inventor
Kirk G. Haseltine
By Philip A. Ferrell
Attorney

June 13, 1933. K. G. HASELTINE 1,913,804
FRUIT SIZING MACHINE
Filed Jan. 8, 1931   3 Sheets-Sheet 2
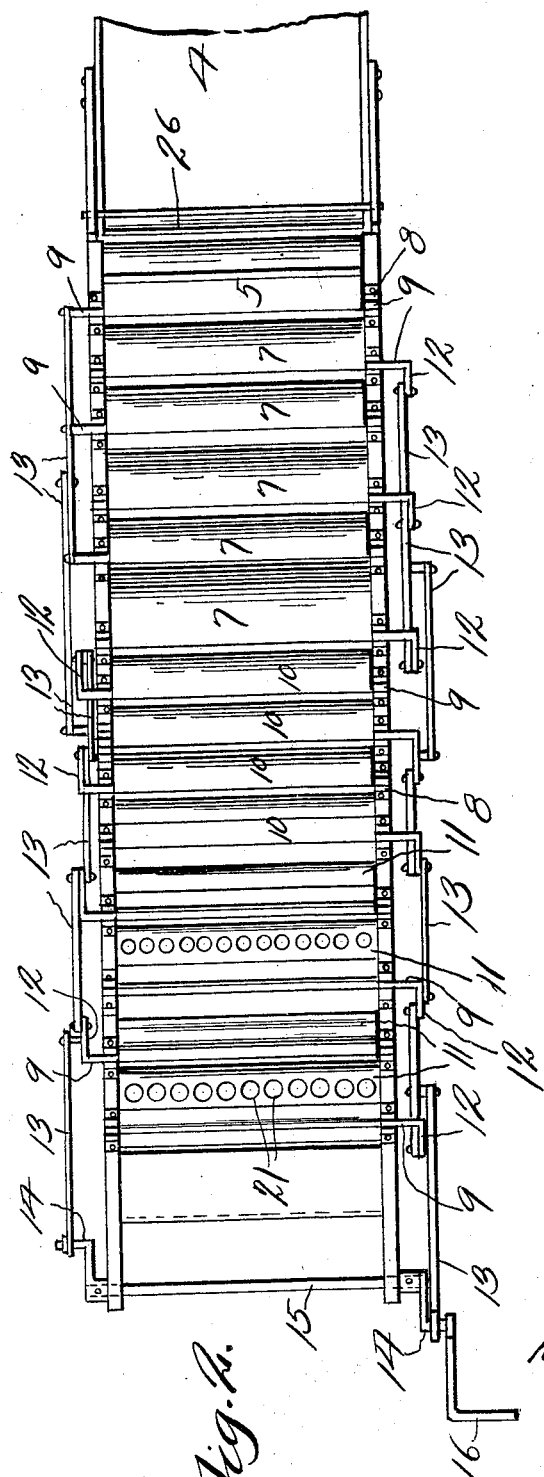
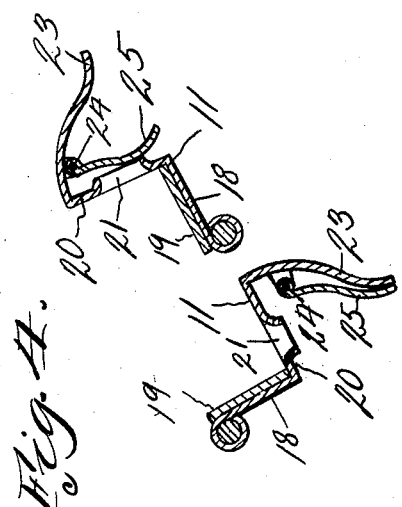
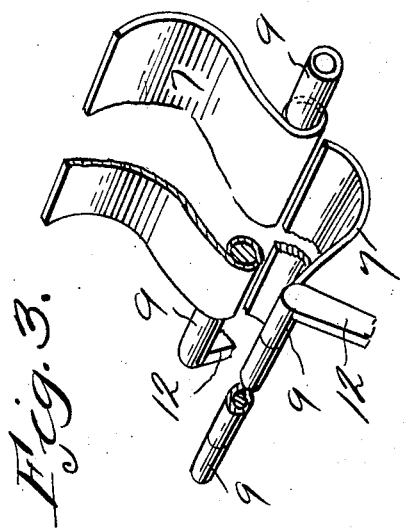
Inventor
Kirk G. Haseltine
By Philip A. H. Jerrell
Attorney June 13, 1933.  K. G. HASELTINE  1,913,804
FRUIT SIZING MACHINE
Filed Jan. 8, 1931   3 Sheets-Sheet 3
Fig. 5.
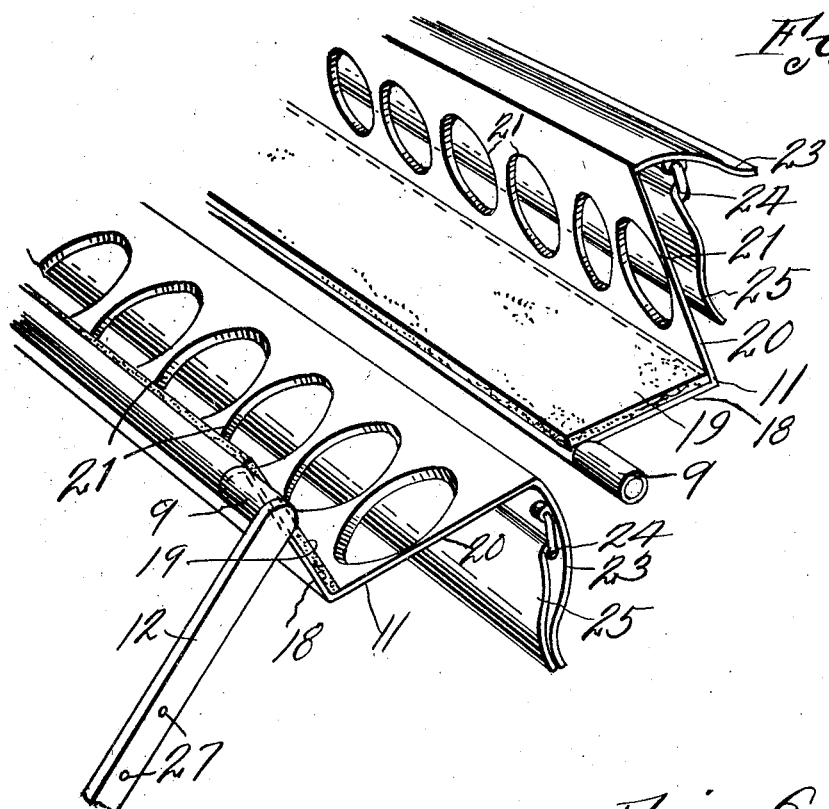
Fig. 6.
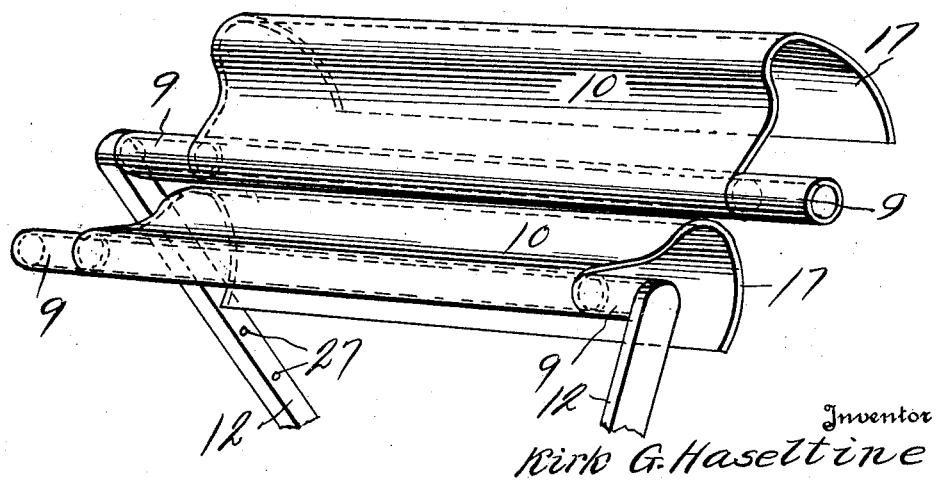
Inventor
Kirk G. Haseltine
Attorney Patented June 13, 1933

1,913,804

UNITED STATES PATENT OFFICE

KIRK GRUBER HASELTINE, OF SPRINGFIELD, MISSOURI

FRUIT SIZING MACHINE

Application filed January 8, 1931. Serial No. 507,493.

The invention relates to fruit sizing and conveying machines, and has for its object to provide a device of this character comprising a plurality of hinged fruit receiving members, some of which are provided with different size apertures, and means cooperating with said members whereby they will be hingedly moved for discharging fruit thereon from one member to the other.

A further object is to arrange some of the hinged members at the feeding end of the device on an incline whereby fruit will be elevated and discharged onto hinged inspection members, where the fruit can be inspected, culled and the like, and then discharged onto the sizing members.

A further object is to provide discharge chutes beneath the hinged sizing members, and into which the sized fruit is discharged.

A further object is to provide the hinged sizer members with hinged plates, positioned whereby when the sizer plates are moved to positions to discharge onto adjacent sizer plates they will engage fruit which may be stuck in the sizer plate holes, and dislodge the same.

A further object is to provide operating means cooperating with alternate plates whereby when one plate is raised, the adjacent plates are lowered to positions to receive the fruit transverse thereto from the raised plates.

A further object is to provide the ends of the hinged plates with pintles mounted in U-shaped bearings, thereby allowing the plates to be easily removed, and levers carried by said plates alternately at opposite sides of the machine, and connected to an operating crank through a system of links, and in a manner whereby the plates are alternately raised and lowered.

A further object is to form the sizing plates angular in cross section, the outer edge of one of the flanges being provided with pintles, and the other flange provided with sizing apertures through which fruit is discharged.

A further object is to provide the outer edge of the apertured flange of the sizing plates with an outwardly extending flange, to the under side of which the bumper plates are hingedly connected in a position whereby when the plates are rocked upwardly, said bumper plates will swing towards the apertures of the apertured flange for dislodging fruit stuck in the apertures.

A further object is to provide the outer edges of the inspection plates with downwardly extending guard flanges, movable in arcs adjacent the pivoted edge of adjacent plates for preventing accidental discharge between the plates as they move in different directions.

With the above and other objects in view, the invention resides in the combination and arrangement of parts as hereinafter set forth, shown in the drawings, described and claimed, it being understood that changes in the precise embodiment of the invention may be made within the scope of what is claimed without departing from the spirit of the invention.

In the drawings:

Figure 2 is a top plan view.

Figure 3 is a perspective view of adjacent elevating plates.

Figure 4 is a vertical transverse sectional view through adjacent sizing plates.

Figure 5 is a detail perspective view of adjacent sizing plate ends.

Figure 6 is a perspective view of adjacent inspection plates.

Figure 1:
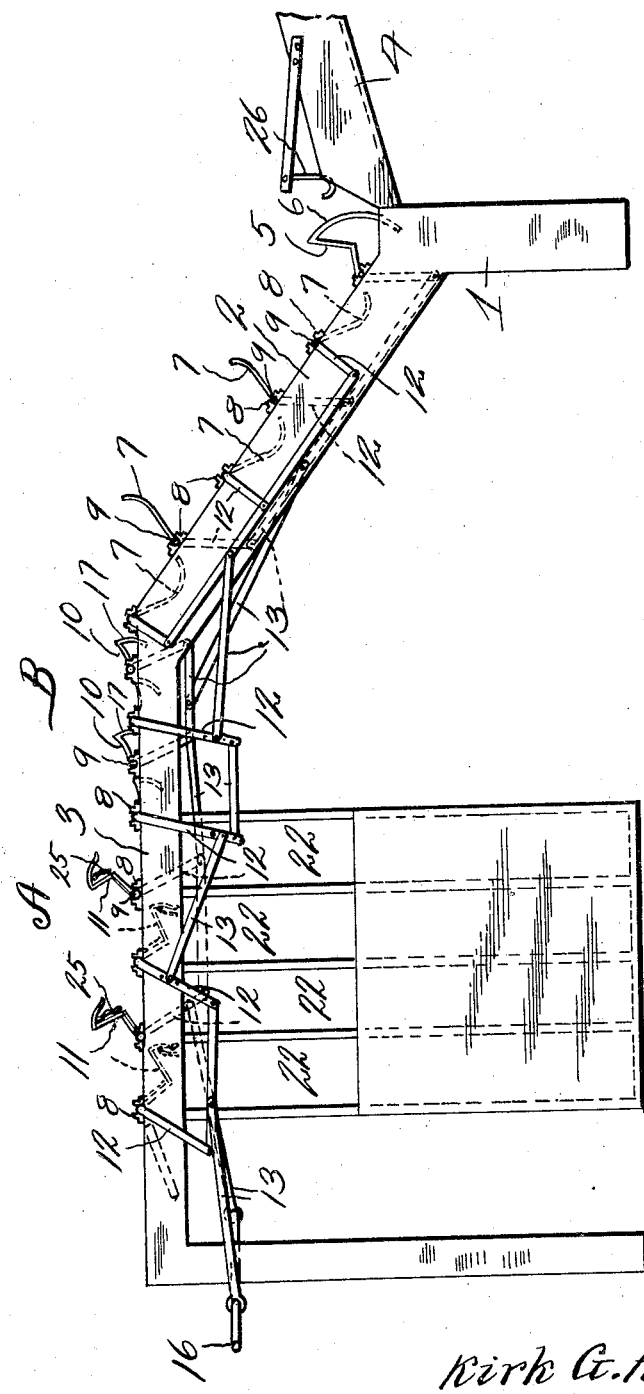
Figure 1 is a side elevation of the machine.
Figure 7:
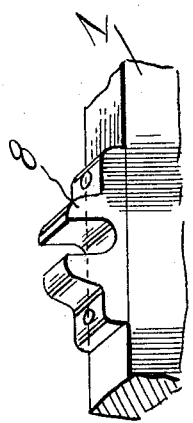
Figure 7 is a detail perspective view of one of the supporting bearings for the plates.

Referring to the drawings, the numeral 1 designates the frame of the machine, which frame is provided with an upwardly inclined elevating portion 2, a horizontal portion 3, and which horizontal portion is divided into a sizing section A, and an inspection section B. In operation fruit to be sized is fed to the machine from an inclined trough 4 onto the first angularly shaped elevating plate 5, which is provided with an arcuate flange 6 for preventing further feeding from the chute 4 as the plate 5 is rocked upwardly. The elevating section 2 is provided with transversely disposed hinged elevating plates 7, and the fruit being elevated is discharged successively onto the plate for the elevating operation, and which elevating operation is accomplished by alternately rocking the plates 5 and 7 upwardly and downwardly to discharge the fruit by gravity from one plate to the other. The frame 1 has its opposite sides provided with U-shaped bearings 8 for receiving the pintles 9 of the elevating plates 6 and 7 and of the inspection and sizing plates 10 and 11, therefore it will be seen by making the bearings 8 U-shaped, the various plates are not only hingedly mounted, but mounted in a manner whereby they may be easily removed for repair and replacement purposes without disturbing adjacent plates or the general assembly of the device.

Pintles 9, at opposite sides of the machine, are provided with downwardly extending arms 12, which are connected together by links 13 and to oppositely extending cranks 14 of an operating shaft 15, in a manner whereby alternate hinged plates will move in opposite directions for the conveying operation and transfer of fruit by gravity from one plate to the other.

It will be noted by referring to the elevating plates 7 that they are curved at their outer ends so that when they are in their lower positions as shown in dotted lines, Figure 1, and the other plates in raised position, shown in full lines in said figure, fruit on the raised plates will roll by gravity into the next higher plate to be further elevated; and as the operating crank 6 is rotated, the oscillation of the levers 12 continues through the medium of the links 13, thereby causing the elevating plates to alternately swing downwardly and upwardly for conveying fruit upwardly towards the inspection plate B, Figure 1.

The fruit elevated on the plates 7 is finally discharged onto the inspection plates 10, and which plates are curved in vertical transverse cross section and terminate in downwardly curved flanges 17, which swing in arcs adjacent the pivoted edges of the inspection plates, as clearly shown in Figures 1 and 6. Flange 17 forms means for preventing fruit from being discharged between the plates as they are alternately oscillated for raising and discharging by gravity fruit from one plate to the other. During this gravity discharge, the fruit is rolled and can be thoroughly inspected and culled before it is finally discharged onto the sizing plates 11, which may be any number, however for purposes of illustration three are shown. The sizing plates 11 are angular shaped in vertical cross section, and the flange 18 is provided with a pad 19, formed from felt or other material for preventing damage to fruit transferred.

The other flange 20 of each hinged sizing member is provided with a plurality of apertures 21 through which fruit of the proper size passes by gravity. The apertures 21 of each sizing member are of different diameters, therefore it will be seen that fruit passed through the machine and conveyed by the various hinged members, will be properly sized and discharged into chutes 22 beneath the plates, which chutes may lead to bins or any other suitable source of discharge. In sizing fruit some of the fruit sticks in the sizing apertures 21 when the fruit is slightly oversize for the apertures, and to obviate this difficulty, the flange 20 of each sizing member 11 is provided with an angular flange 23, to the under side of which is hingedly connected at 24 a bumper plate 25. It will be noted that the bumper plates 25 are positioned whereby when the hinged sizing members are in their upper positions, the bumper plates will hit and dislodge any fruit which may become stuck in the apertures 21, and dislodge the fruit at a time where it will roll by gravity over the inclined pad 19 and onto the apertured sizing flange 20 of the adjacent hinged member; therefore it will be seen that fruit will not become stuck and remain stuck in the sizing apertures.

If desired the elevating plates may be eliminated and the chute 4 arranged so as to discharge fruit onto the inspection plate 10 or onto the sizing plate. These features vary according to the fruit to be sized and the size of machine desired. The chute 4 is preferably provided with a downwardly extending hinged plate 26 for preventing too rapid feeding of fruit from the chute.

The arms 12 of the various plates are preferably provided with apertures 27 so that the leverage may be varied for the various plates.

From the above it will be seen that a fruit sizing machine is provided, which is simple in construction and provided with a plurality of hinged plates for receiving, elevating and rolling for inspection purposes, fruit before it is discharged onto combined conveying and sizing plates which are also hingedly mounted; and operating means is provided in connection with the hinged plates whereby when alternate plates reach their raised positions, other plates will be lower positions for the reception of fruit discharged from the first mentioned plates.

The invention having been set forth what is claimed as new and useful is:—

1. A sizing machine comprising a frame, a plurality of hingedly mounted members in said frame, means for hingedly moving alternate hinged members in opposite directions whereby articles will be transferred from one hinged member to the other to pass through sizing apertures in the hinged members, flanges carried by the outer edges of the hinged members and hinged buffer plates carried by the inner sides of said flanges and positioned whereby when the hinged members are in raised position they will engage articles stuck in all the sizing apertures of adjacent hinged members and dislodge the same and when in down position will be limited in their movement in an opposite direction by said flanges.

2. A sizing machine comprising a frame, hingedly mounted apertured sizing members in said frame, said sizing members being angularly shaped in vertical transverse cross section, thereby forming inner and outer flanges, said outer flanges being provided with sizing apertures, a third flange carried by the outer flange of each hingedly mounted member and buffer plates hingedly connected to the third flange and positioned whereby when the hingedly mounted members approach raised positions they will swing towards the apertures of the outer flanges.

3. A sizing machine comprising a frame, hingedly mounted apertured sizing members in said frame, said sizing members being angularly shaped in vertical transverse cross section thereby forming inner and outer flanges, said outer flanges being provided with sizing apertures, a third flange carried by the outer flanges of the hingedly mounted members, buffer plates hingedly connected to the third flanges and positioned whereby when the hingedly mounted members approach their raised positions they will swing towards the apertures of the outer flanges, and when said members swing towards their lower positions the third flanges will limit the outward swinging movement of the buffer plates and means for alternately raising and lowering the hinged members.

4. A sizing machine comprising a frame, a plurality of hingedly mounted members in said frame having sizing apertures therein, means for alternately moving the hinged members in opposite directions whereby articles are transferred from one member to the other and a single plate carried by each hingedly mounted member whereby when they are in raised position articles stuck in the apertures thereof will be dislodged, said hingedly mounted members being angularly shaped in transverse cross section and comprising inner and outer flanges, an acutely positioned flange carried by the outer flange and extending outwardly in relation thereto, said single plate being hingedly connected to said acutely positioned flange.

5. A sizing machine comprising a frame, hingedly mounted apertured sizing members in said frame, means for hingedly moving said hingedly mounted members to positions where articles to be sized will be transferred from one member to the other and gravity actuated hinged bumper plates carried by the hinged members on their inner sides and forming means whereby all articles stuck in the apertures of each member will be simultaneously dislodged when said members are in raised discharge positions, said hingedly mounted apertured sizing members limiting the movement of the bumper plates in one direction.

In testimony whereof he hereunto affixes his signature.

KIRK GRUBER HASELTINE.